July 23, 1935. R. E. HENRY 2,009,049
BAGGING MACHINE
Filed Oct. 5, 1933
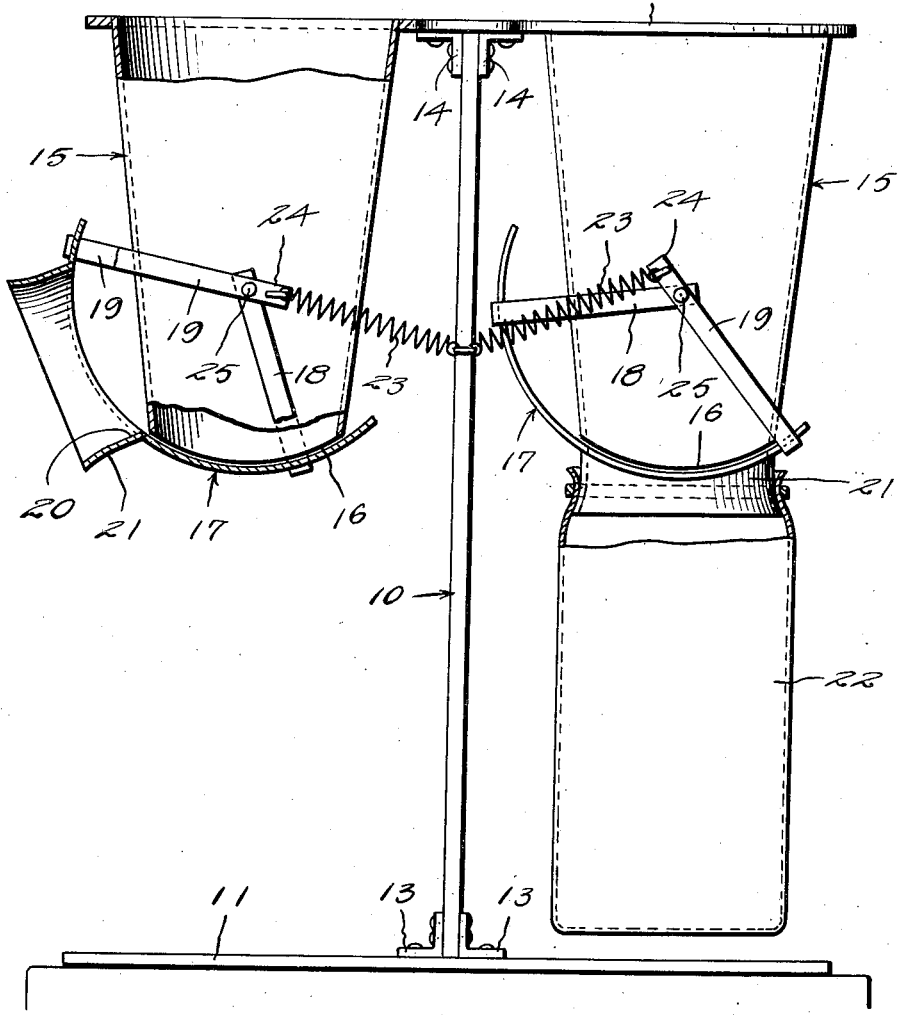
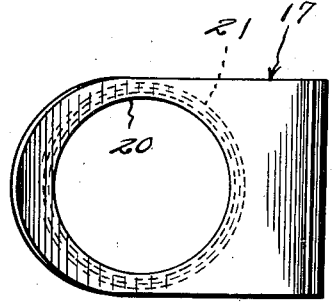
Inventor
R. E. Henry
By Watson E. Coleman
Attorney Patented July 23, 1935

2,009,049

UNITED STATES PATENT OFFICE 2,009,049

BAGGING MACHINE

Roy E. Henry, Elba, N. Y.

Application October 5, 1933, Serial No. 692,334

2 Claims. (Cl. 226—61)

This invention relates to bagging and weighing devices and has for an important object thereof the provision of a means for weighing and bagging a predetermined quantity of material.

Another object of this invention is to provide a bagging and weighing machine of this type which is so constructed that when the hopper portion thereof is emptied, the discharge end of the hopper will be automatically closed.

A further object of this invention is to provide a device of this kind which is constructed to facilitate the bagging and weighing of predetermined quantities of material, the device being so constructed that one portion thereof may be in the process of filling while another portion thereof is being emptied, thereby permitting a substantially continuous bagging operation while the material is being placed in the hoppers.

The above and various other objects and advantages of this invention will in part be described and in part be understood from the following detailed description of the present preferred embodiment, the same being illustrated in the accompanying drawing wherein:—

Figure 1 is a detail side elevation of a device constructed according to the preferred embodiment of this invention partly in section.

Figure 2 is a plan view of the closure for the hopper.

Referring to the drawing wherein like numerals of reference designate corresponding parts throughout the views, the numeral 10 designates generally a standard provided with a base 11 and a top 12. The standard or upright member 10 is secured to the base 11 by means of angle members 13 and the top 12 is secured to the upper end of the standard 10 by means of angle members 14. The top 12 extends on opposite sides of the standard 10 and has on each side thereof a hopper 15. The hoppers 15 are identical in conper 15. The hoppers 15 are identical in construction and are provided in pairs so that one hopper may be in the process of being filled while the other hopper is in the process of being emptied and the material in the latter hopper being discharged into a bag. The hopper 15 is open at the upper end and is also open at the lower end, and this lower end 16 is preferably restricted and cut on an arc, the purpose for which will be hereinafter described.

A segmental closure in the form of a plate 17 engages the arcuate lower end 16 of the hopper 15 and is swingably secured on the bottom of the hopper 15 by means of bracing member or radial arms 18 and 19. The closure or swinging bottom 17 is provided adjacent one end thereof with an opening 20 substantially equal in size to the diameter of the restricted lower end portion 16 of the hopper 15 and a flaring bag holding rim 21 is disposed about the opening 20.

This rim 21 is adapted to have disposed thereabout the open upper end of a bag which may be releasably secured in any desired manner thereto so that the bag 22 will be held in depending relation below the hopper 15. The closure 17 is automatically moved into closed position by means of a spring 23 which has one end thereof secured to the standard 10 and the other end secured to an extension 24 integral with the radial arm 19. The radial arms 18 and 19 are pivoted to the side wall of the hopper 15 by means of pivotal members 25.

In the use and operation of this bagging and weighing device, each hopper 15 is constructed of a size to hold a predetermined quantity of material and, if desired, the standard 10 may have the base 11 thereof mounted on a conventional platform scale and the scale so adjusted that when each hopper 15 is empty, the scale will balance or register zero.

A grading device is adapted to be disposed with the open or discharge end thereof in a position to discharge, when desired, into the open upper ends of each hopper 15, and after one of the hoppers 15 has been filled with the desired quantity of material, the bag 22 can be disposed about the flaring rim or bag holding member 21 with this member 21 initially in inoperative position relative to the discharge end of the hopper 15. When the bag 22 has been secured about the rim 21, the closure 17 can be moved into open position with the opening 20 registering with the open bottom 16 of the hopper 15 whereupon the material in the hopper 15 will flow or drop into the bag 22.

While this operation is going on, the other hopper 15 can be filled and after the bag 22 on one side of the standard 10 has been filled and the bag thereof removed from the rim 21, the spring 23 will automatically swing the closure 17 into closed position.

It will be apparent from the foregoing that a practically continuous filling operation can be performed as one hopper can be emptied into a bag while the other hopper is being filled from the grading device or other source of supply.

It is, of course, understood that various changes and modifications may be made in the details of construction and design of the above specifically described embodiment of this invention without departing from the spirit thereof, such changes and modifications being retricted only by the scope of the following claims.

What is claimed is:—

1. A device as set forth comprising a relatively stable standard, a pair of hoppers, means for mounting the hoppers one on each side of the standard, each hopper having an open upper end and an open lower end, the lower end of each hopper being disposed on an arc, a segmental plate closure slidingly engaging the arcuate lower end of each hopper, means for swingably mounting said plate for movement into open or closed position, said plate having an opening adjacent one end thereof adapted upon movement of the plate in one direction to register with the open lower end of the hopper, a flaring rim disposed about the opening of the plate and adapted to be engaged by a bag, said rim supporting a bag in depending position in alinement with the hopper, and a spring engaging the standard and the plate supporting means to automatically swing the plate into closed position when the hopper has been emptied and the bag removed from the rim.

2. A device as set forth, comprising a standard, a hopper, means for mounting the hopper on the standard, said hopper having an open upper end and an open lower end, the lower end of said hopper being disposed on an arc, a segmental closure plate slidingly engaging the arcuate lower end of said hopper, means for swingably mounting said plate for movement into open or closed position, said plate having an opening adjacent one end thereof adapted upon movement of the plate in one direction to register with the open lower end of the hopper, a flaring rim disposed about the opening of the plate and adapted to be engaged by a bag, said rim supporting a bag in depending position in alinement with the hopper, and a spring engaging the standard and the plate supporting means to automatically swing the plate into closed position when the hopper has been emptied and the bag removed from the rim.

ROY E. HENRY.